(12) United States Patent
Reichert et al.

(10) Patent No.: US 6,217,623 B1
(45) Date of Patent: Apr. 17, 2001

(54) METHOD OF FABRICATING AN ELECTROCHEMICAL DEVICE

(75) Inventors: Veronica R. Reichert, Bethlehem; Frank Russell Denton, III; Shekhar L. Pendalwar, both of Lawrenceville, all of GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/963,499

(22) Filed: Nov. 3, 1997

(51) Int. Cl.[7] .................................................. H01M 10/38
(52) U.S. Cl. ......................................... 29/623.5; 29/623.1
(58) Field of Search ............................. 29/623.5, 623.1; 429/174, 304, 177

(56) References Cited

U.S. PATENT DOCUMENTS 5,436,091 * 7/1995 Shackle et al. ...................... 429/304
5,591,548     1/1997 Mao .
5,635,151     6/1997 Zhang et al. .

OTHER PUBLICATIONS

Hoy et al., Supercritical Fluid Spray Technology, *Polymer Preprints*, Apr. 1990, vol. 31, No. 1, pp. 679–680.*

* cited by examiner

*Primary Examiner*—John S. Maples
(74) *Attorney, Agent, or Firm*—Philip H. Burros, IV

(57) ABSTRACT

A method (80) of manufacturing an electrochemical cell having electrodes and a separator element is disclosed. The method comprises the steps of providing (81) a mixture consisting of either an electroactive or inert material and a polymeric binder, transferring (83) the mixture into a pressure vessel, introducing (85) a gas into the pressure vessel, adjusting (87) the pressure and temperature inside of the pressure vessel such that the gas reaches a critical point at which the gas behaves like a supercritical fluid, and spraying (89) the mixture onto at least one of the current collecting substrates, electrodes and/or the separator element.

3 Claims, 4 Drawing Sheets

METHOD OF FABRICATING AN ELECTROCHEMICAL DEVICE

TECHNICAL FIELD

This invention relates in general to energy storage devices and more particularly to an environmentally-friendly method of fabricating an electrochemical device.

BACKGROUND

Organic chemical solvents are commonly used in a variety of manufacturing processes. Unfortunately, these solvents have been shown to have deleterious effects on both humans and the environment. In an effort to address such concerns, industries in general are continuously seeking ways to prevent the release of such solvents during manufacturing operations. The release of solvents into the atmosphere is most effectively reduced or eliminated through the development of solvent-free manufacturing processes. For instance, battery manufacturing processes are heavily dependent upon solvents; as a result, those in the battery industry are in constant search of alternatives. Organic solvents are integral to the manufacture of many high performance rechargeable or secondary battery cells. For example, one state-of-the-art rechargeable cell which currently requires the use of organic solvents during manufacture is described in co-pending U.S. patent application Ser. No. 08/714,032 entitled "Gel Electrolyte Bonded Rechargeable Electrochemical Cell and Method of Making Same" filed on Sep. 23, 1996. It would be tremendously beneficial to be able to reduce the use of solvents in the manufacture of this and other cells.

For the foregoing reasons, it would be desirable to develop a method of manufacturing battery cells, e.g., the aforementioned rechargeable cell, which requires less organic solvent or, better yet, eliminates the need for organic solvents altogether. The method should be cost-effective and efficient, and should not negatively impact the functionality of the cell.

DETAILED DESCRIPTION OF THE PREFERRED EMBODIMENT

Figure 1:
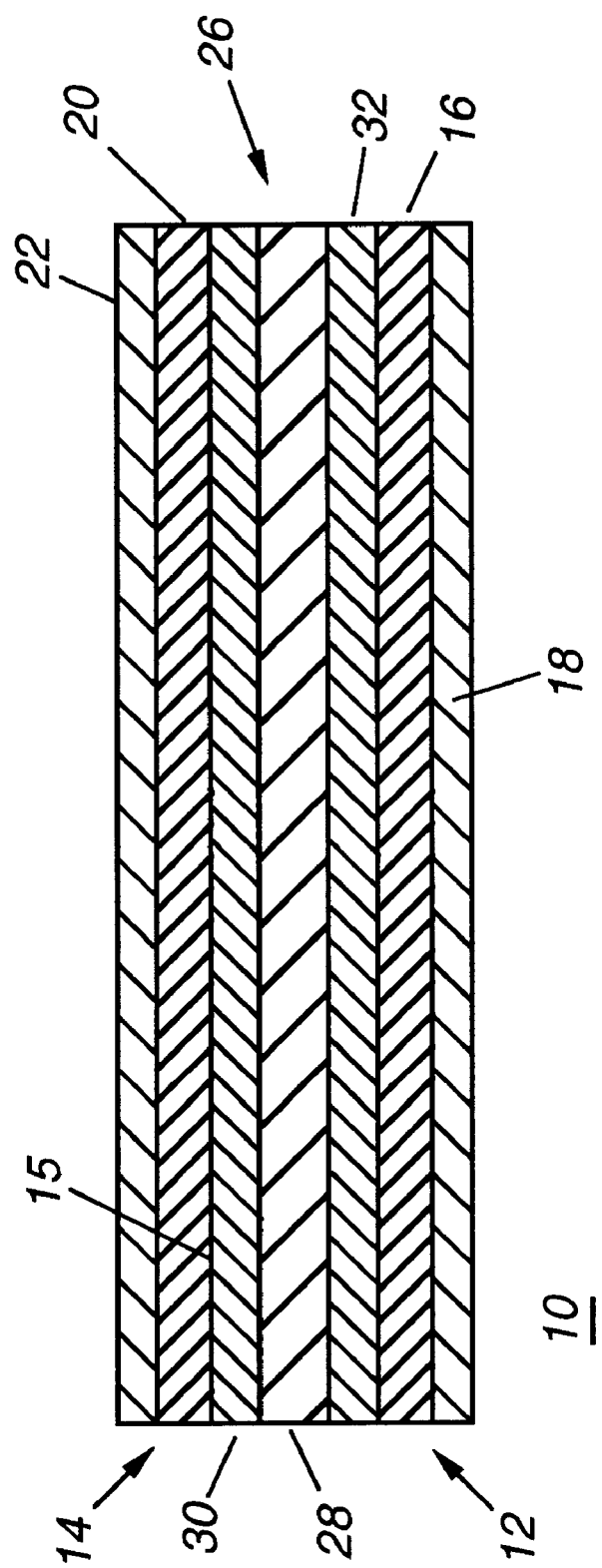
FIG. 1 is a cross-sectional side view of an electrochemical cell manufactured in accordance with the invention.

While the specification concludes with claims defining the features of the invention that are regarded as novel, it is believed that the invention will be better understood from a consideration of the following description in conjunction with the drawing figures, in which like reference numerals are carried forward.

We have derived a novel method of constructing an energy storage device which greatly reduces the use of organic solvents. The method incorporates a known technology referred to as "supercritical fluid (SCF) spray" technology. Although some discussion of SCF technology is provided herein, for a more detailed discussion the reader is directed to a 1990 article entitled "Supercritical Fluid Spray Technology: An Emission Control Technology for the Future," K. Hoy, M. Donahue, Polymer Preprints, Vol. 31(1). Although it will occur to one skilled in the art that our method may be employed to manufacture a variety of energy storage devices, our preferred embodiment describes the use of SCF technology to manufacture a lithium-ion gel electrolyte bonded rechargeable electrochemical cell.

Referring now to FIG. 1, there is illustrated therein a cross sectional side view of a gel electrolyte bonded electrochemical cell manufactured in accordance with the instant invention. The cell 10 includes first and second electrodes 12 and 14 respectively. The first electrode may be, for example, an anode in a lithium rechargeable cell. Accordingly, the anode may be fabricated of any of a number of different known materials for lithium rechargeable cells, examples of which include metallic lithium, lithium, lithium alloys, such as lithium: aluminum, and lithium intercalation materials such as carbon, petroleum coke, activated carbon, graphite, and other forms of carbon known in the art. In one preferred embodiment, the anode 12 is fabricated of an amorphous carbonaceous material such as that disclosed in commonly assigned, co-pending U.S. patent application Ser. No. 08/561,641 entitled "Improved Carbon Electrode Materials For Lithium Battery Cells And Method of Making Same" filed on Nov. 22, 1995, in the names of Jinshan Zhang, et al., the disclosure of which is incorporated herein by reference.

More particularly, the anode 12 comprises a layer of active material 16 such as a carbon material as described hereinabove deposited on a substrate or current collector 18. Substrate 18 may be any of a number of materials known in the art, examples of which include copper, gold, nickel, copper alloys, copper plated materials, and combinations thereof. In the embodiment of FIG. 1, the substrate 18 is fabricated of copper. The second electrode 14 may be adapted to be the cathode of a lithium rechargeable cell. In such an instance, the cathode is fabricated of the lithium intercalation material such as is known in the art, examples of which include lithiated magnesium oxide, lithiated cobalt oxide, lithiated nickel oxide, and combinations thereof. In one preferred embodiment, the cathode 14 is fabricated of a lithiated nickel oxide material such as is disclosed in commonly assigned, U.S. Pat. No. 5,591,548 in the name of Zhenhua Mao filed Jun. 5, 1995, and incorporated herein by reference.

More particularly, the cathode 14 comprises a layer of the cathode active material 20 disposed on a cathode substrate or current collector 22. The cathode material 20 maybe such as that described hereinabove, while the substrate may be fabricated from any of a number of known materials known in the art, examples of which include aluminum, nickel, and combinations thereof. In one preferred embodiment, substrate 22 is fabricated of aluminum.

Disposed between electrodes 12 and 14 is a layer of an electrolyte material system 26. The electrolyte system 26 comprises an electrolyte active species and a multi-phase polymer gel electrolyte support structure consisting of at least two different polymers. A first polymer is provided as an absorbing phase and the second polymer is provided as an inert phase. The inert phase 28 is provided to give mechanical integrity and structural rigidity to the electrolyte system. The absorbing phase 30, 32, which may be disposed on either or both sides of the inert phase, is adapted to engage the electrolyte active species therein. The gelling polymer may further act as a bonding paste to assist in adhering the electrodes to the inert polymer.

The electrolyte active species is a liquid or solid component (or both) which provides ionic conductivity between the anode and the cathode. In the embodiment in which the electrochemical cell 10 is a lithium intercalation cell, the electrolyte active species consists of an alkali metal salt in a solvent. Typical alkali metal salts include, but are not limited to, salts having the formula $M^+X^-$ where $M^+$ is an alkali metal cation such as $Li^+$, $Na^+$, $K^+$, and combinations thereof; and $X^-$ is an anion such as $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_3^-$ and combinations thereof. The solvent into which the salt is dispersed is typically an organic solvent including, but not limited to, propylene carbonate (PC), ethylene carbonate (EC), diethyl carbonate (DEC), dimethyl carbonate (DMC), dipropylcarbonate, dimethylsulfoxide, acetonitrile, dimethoxyethane, tetrahydrofuran, N-methyl-2-pyrrolidone (NMP), acetone and combinations thereof. For other electrode combinations, i.e., Ni—Cd or Ni-metal hydride, other electrolyte active species may be used, such as KOH.

Figure 2:
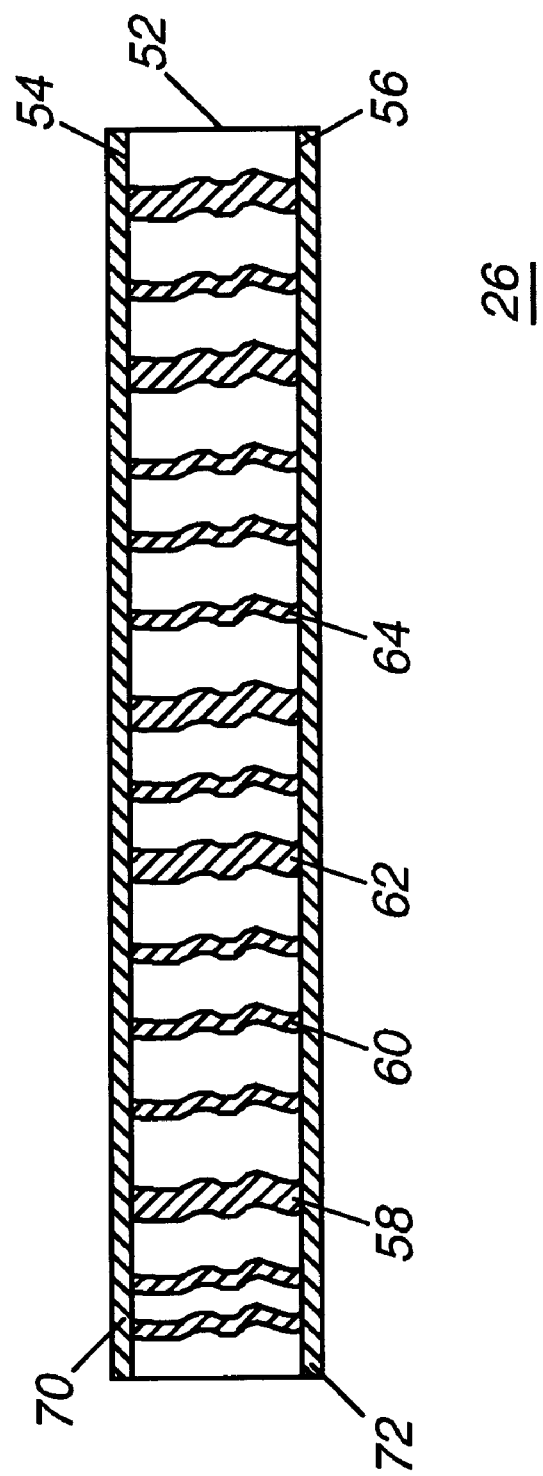
FIG. 2 is a cross-sectional side view of an electrolyte layer for use with an electrochemical cell, in accordance with the invention.

Referring now to FIG. 2, there is illustrated therein a cross-sectional side view of the electrolyte layer 26 of FIG. 1. The electrolyte system 26 comprises a first polymer phase 52 which is a porous separator formed of a layer of inert polymer material. The term inert refers to the fact that the material itself is not absorbing, though the layer of material, due to its porosity (as described below) may be absorbing. This inert component may be fabricated or selected from the group of materials consisting of polyalkenes such as polyethylene, polypropylene, polytetrafluroethylene, polyethyleneterephthalate, polystyrene, ethylene propylene diene monomer, nylon, and combinations thereof. Furthermore, the inert layer may comprise either single- or multi-ply constructtion. Layer 52 includes first and second major surfaces 54 and 56, respectively. Layer 52 may preferably be fabricated of polyethylene or polypropylene and is a highly porous layer having a plurality of pores, for example, 58, 60, 62 and 64 formed therein and therethrough. Indeed, the porosity of layer 52 is typically on the order of between 20 and 80%, and preferably between about 28 and 50%. As layer 52 is a layer of inert polymeric material, it is hence provided to enhance the mechanical strength or integrity of the polymer electrolyte system.

Disposed on at least one of the first and second major surfaces, 54, 56 is a layer of an absorbing or gel-forming polymer 70. The absorbing or gel-forming polymer may be selected from the group of polymers, including polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof. As illustrated in FIG. 2, the layer of the second polymeric material 70 is disposed on surface 54 of layer 52, and said polymeric material extends at least partially into and preferably through the pores in layer 52. A second layer 72 of a second polymeric material may be disposed on the second major surface 56 of layer 52. By disposing a layer of the second polymeric material on both sides of layer 52, it may be appreciated that the likelihood of completely filling the pores is increased. The layers of gel forming polymer 70, 72 may be fabricated of the same or different materials, as described hereinabove.

It is also to be noted that the layers of absorbing or gel forming polymer may alternatively be deposited on the electrodes, and subsequently put into contact with the inert polymer layer when the electrodes and the inert polymer are stacked together to complete the battery cell. More particularly, a layer of the absorbing polymer may be coated onto at least one surface 15 (of FIG. 1) of, for example, the cathode. Surface 15 is ultimately disposed adjacent the electrolyte system 26: Hence, when the inert polymer layer is arranged in stacked configuration with the electrodes, the absorbing polymer is disposed in contact with the inert polymer. Subsequently, when the stacked layers are pressed together, the absorbing polymer invades the pores of the inert polymer, adhering thereto as described hereinbelow.

Figure 3:
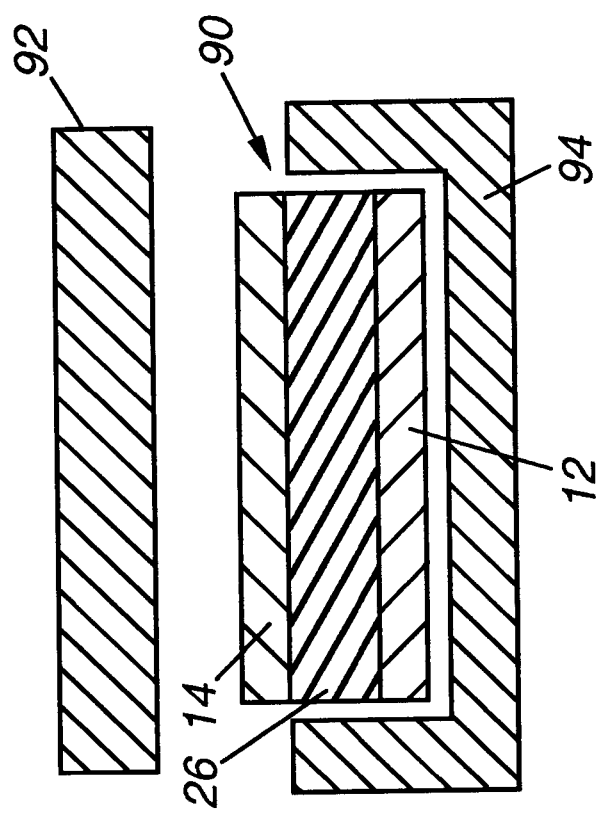
FIG. 3 is a stylized representation of the step of packaging an electrochemical anode, separator and cathode, in accordance with the invention.

The electrodes and separator materials described above may be fabricated into electrochemical cells by winding and/or stacking the layers of electrode and separator material. Discrete cells are then packaged between sheets of a vapor impermeable package as is illustrated in FIG. 3. More particularly, discrete cell 90, is packaged between sheets of water vapor impermeable material such as metal foil laminates. Sheets 92 and 94 enclose the discrete package, or cell. The package is sealed and thereafter, the electrolyte active material, as described above, is injected into the sealed package.

The battery cell is then cured by exposing it both to a compression and heating step. More particularly, the packaged discrete battery cell is exposed to a temperature of between 50 and 150° C. for a period of time between 6 and 3600 seconds. The exact time will depend on the size of the cells themselves. The compression force used to seal and cure and battery pack is on the order of between 1 and 500 lbs/cm$^2$ and preferably between 50 and 100 lbs/cm$^2$. This heating and pressing step results in the absorbing polymer material being dissolved, along with the liquid electrolyte active species, wherein they seep or are forced into the pores of the inert polymer. When the cell cools and solidifies, or "gels," it serves the additional function of adhering the layers of electrode material to the separator.

Figure 4:
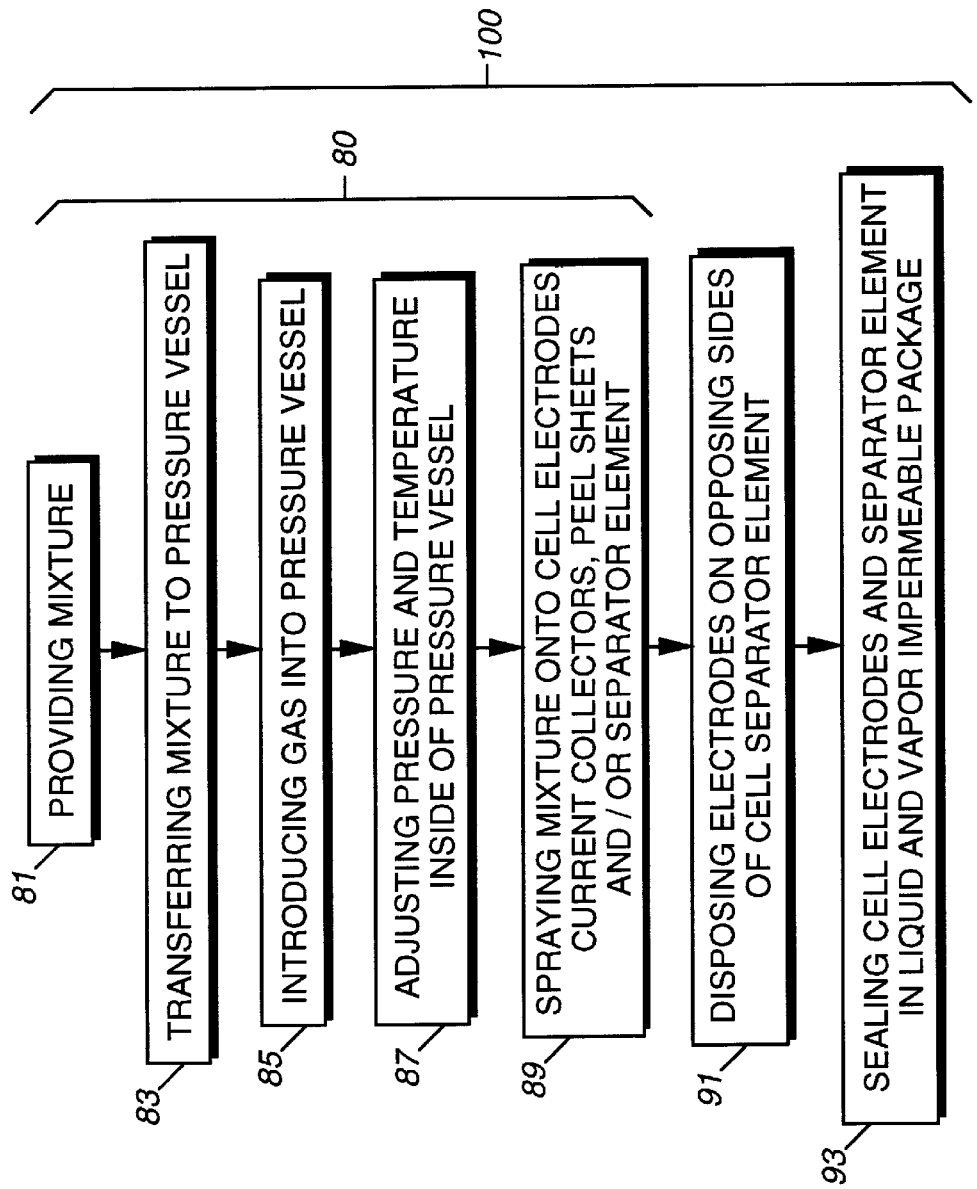
FIG. 4 is a flow chart diagram illustrating a method of manufacturing an electrochemical cell, such as the cell depicted in FIG. 1, in accordance with the present invention.

Referring now to FIG. 4, a flow chart is provided to illustrate our preferred method 80 for applying layers of absorbing or gel forming polymer during the manufacture of the aforementioned electrochemical cell. Initially, in steps 81 and 83, a mixture is provided—consisting of an electroactive material (e.g., carbon, lithium oxide, etc.) and a polymeric binder (e.g., poly(vinylidene fluoride, etc.)—and transferred into a pressure vessel portion of a spray coating apparatus. In some instances, a nominal amount of solvent may be added for the purpose of dissolving the polymeric binder. In step 85, a quantity of gas, such as carbon dioxide, is pumped into the vessel. In step 87, the pressure and temperature inside of the vessel are adjusted such that the gas reaches a critical point at which it is transformed into an SCF. The critical point of a material is defined as the point at which the liquid and vapor phases of the material become indistinguishable. The properties exhibited by a SCF are in between those of the gas and liquid. For example, the critical point of carbon dioxide is readily obtainable (31° C., 73 atmospheres). Once the critical point is achieved, the mixture is ready to be transferred. In step, 89, the mixture is sprayed from the pressure vessel onto either the electrodes or separator element of the electrochemical cell, or both. SCF carbon dioxide is non-toxic, non-flammable, environmentally-friendly and relatively inexpensive. Our method provides a means for fabricating an electrochemical cell which greatly reduces or elminates the existing problems associated with the use of organic sovents. In our method, SCF carbon dioxide replaces the vast majority of solvent currently used in electrochemical cell fabrication. Electrode films have been traditionally prepared by solvent casting a slurry that consists of the electroactive material, an organic solvent and a polymer binder. For example, a typical anode fabrication of a lithium ion cell is as follows: a given amount of carbon is mixed with a given amount of 10% solution of poly(vinylidene fluoride), or PVDF, in N-methyl-2-pyrrolidone (NMP). Additional NMP is added to make the slurry flowable. Generally, the final slurry consists of 50% solids and 50% NMP solvent. The slurry is then cast (e.g., comma direct, lip coater, gravure or other coating method) onto a metal mesh or foil current collector. The metal electrode assembly must then be extensively dried to remove the NMP.

Still referring to FIG. 4, method 100 depicts two additional steps which may be taken to complete the manufacture of our preferred cell. In step 91, the coated electrodes are disposed on opposite sides of the separator element. Subsequently, in step 93, the electrodes and separator element are sealed in a liquid and vapor impermeable package, as described hereinabove.

The SCF spray method described hereinabove for a mixture of electroactive material and binder may similarly be used for a composition of electrolyte-absorbing polymer containing no electroactive material, the composition serving the purpose of depositing the gelling, adhering, and or adsorbing layers on one or both electrodes (and or on one or both sides of the separator). The absorbing or gel-forming polymer may be selected from the group of polymers, including polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof.

Likewise, the SCF spray method described hereinabove for depositing electrode layers on current collector substrates, may be modified by using, in lieu of an electroactive material, a filler comprising either an inert or a primarily beneficially reactive material that does not store lithium as an energy source for the cell. When combined with binder material, the filler is suitable for use in spraying porous separators directly onto either or both anode or cathode, or onto a peel sheet from which it may be removed as a film. Suitable inert components may be fabricated or selected from the group of materials consisting of polyalkenes such as polyethylene, polypropylene, polytetrafluroethylene, polyethyleneterephthalate, polystyrene, ethylene propylene diene monomer, nylon, and combinations thereof, in the form of powders, fibers, beads, or other finely dispersed forms. Where the film is sintered after deposition, or where the fine powders are converted into a continuous, contiguous form by supercritical spray conditions, no binder is necessary. Beneficially reactive components that do not store lithium as an energy source for the cell are those that, when in contact with an electrode or with electrolyte, do not form any substantial by-products capable of causing the cell to self-discharge. The beneficially reactive components may be fabricated or selected, for example, from the group of materials including (but not limited to) $Li_2O$, $NaAlO_2$, $LiAlO_2$; concentrations above cell saturation levels for electrolytes including (but not limited to) salts having the formula $M^+X^-$, where $M^+$ is an alkali metal cation such as $Li^+$, $Na^+$, $K^+$, and $X^-$ is an anion such as $F^-$, $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, or $C(CF_3SO_2)_3^-$. Suitable binders for inert and/or beneficially reactive components include: polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, because the method lends itself to the deposition and co-deposition of polymers as well as inorganic solids, it offers convenient thin film deposition capabilities for components and cells other than Lithium-ion derived chemistries. For instance, several types of devices employ polymeric separators and/or gels, such as: $H_2SO_4$ gels in thin film sealed lead acid cells; poly(vinylalcohol)-based aqueous KOH gels and various $H_3PO_4$ gels. In these cases, the polymers could be deposited with or without fillers and electrolyte liquids. Similarly, SCF techniques may be applied to carbons, metal oxides/sulfides/selenides, metals (e.g., zinc particles for fuel cells), metal hydride electrodes, and conducting polymers to fabricate numerous cell chemistries.

What is claimed is:

1. A method of making a rechargeable electrochemical cell including first and second electrodes, and a porous separator element having first and second major sides, said method comprising the steps of:

(a) providing a mixture comprising an electroactive material, a polymeric binder and a solvent;

(b) transferring said mixture into a pressure vessel;

(c) introducing a gas into the pressure vessel;

(d) adjusting the pressure and temperature inside of the pressure vessel, such that the gas reaches a critical point at which the gas behaves like a supercritical fluid;

(e) spraying at least one of the lectrodes or the separator element with said mixture;

(f) disposing said first and second electrodes on opposite sides of said separator element; and (g) sealing said first and second electrodes and said separator element in a liquid and vapor impermeable package;

wherein the step of spraying further comprises spraying only the separator element with said mixture.

2. A method of manufacturing a separator for an electrochemical cell, the cell having first and second electrodes and a separator element, the method comprising the steps of:

(a) providing a mixture consisting of an inert or primarily beneficially reactive material, the inert or primarily beneficially reactive material having non-energy storage applicability, and a polymeric binder;

(b) transferring said mixture into a pressure vessel;

(c) introducing a gas into the pressure vessel;

(d) adjusting the pressure and temperature inside of the pressure vessel, such that the gas reaches a critical point at which the gas behaves like a supercritical fluid; and (e) spraying said mixture onto at least one of said electrodes or onto a peel sheet from which a separator film may be lifted.

3. A method as described in claim 2, wherein the gas comprises carbon dioxide.

* * * * *

UNITED STATES PATENT AND TRADEMARK OFFICE
CERTIFICATE OF CORRECTION

PATENT NO. : 6,217,623 B1  
DATED : April 17, 2001  
INVENTOR(S) : Reichert et al.

Page 1 of 1

It is certified that error appears in the above-identified patent and that said Letters Patent is hereby corrected as shown below:

Title page,  
Attorney, Agent or Firm column reads "Burros" should be -- Burrus, IV --.

Column 6,  
Line 38, reads "lectrodes" should be -- electrodes --.

Signed and Sealed this

Eighth Day of January, 2002

Attest:

JAMES E. ROGAN  
*Director of the United States Patent and Trademark Office*

*Attesting Officer*